UNITED STATES PATENT OFFICE.

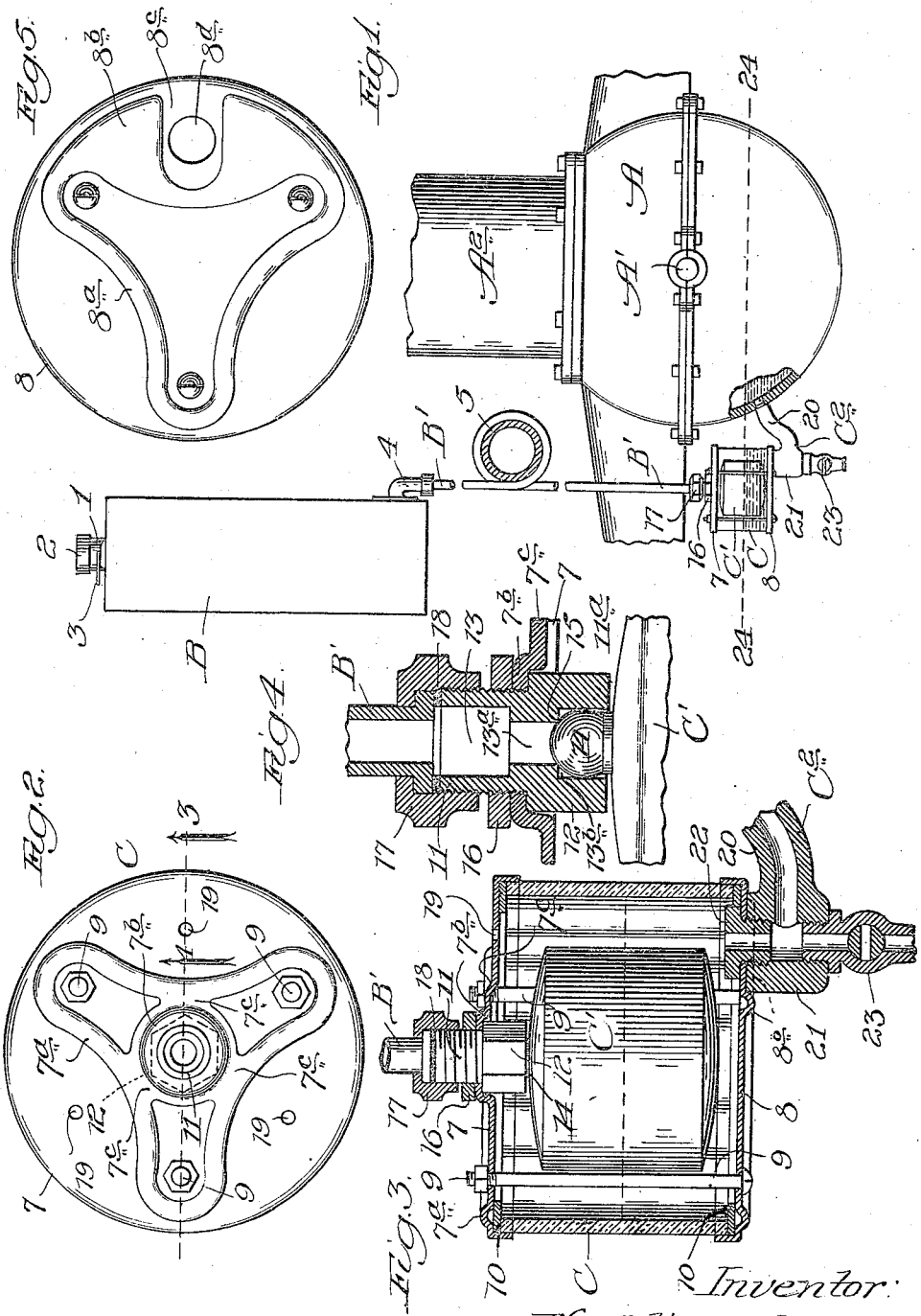

WENDELIN P. SENG, OF CHICAGO, ILLINOIS.

LUBRICATING DEVICE.

1,421,582.  Specification of Letters Patent.  Patented July 4, 1922.

Application filed December 13, 1918. Serial No. 266,575.

*To all whom it may concern:*

Be it known that I, WENDELIN P. SENG, a citizen of the United States, residing at Chicago, in the county of Cook and State of Illinois, have invented a new and useful Improvement in Lubricating Devices, of which the following is a specification.

This invention relates particularly to means for lubricating moving parts of machines, and is devised primarily for use in connection with engines, although the invention may be used in analogous situations.

The primary object is to provide simple and effective means for maintaining lubricating oil at a certain level in the casing in which moving parts are mounted, so that as the oil is used in the lubricating operation, the level will be automatically maintained.

The invention finds especially useful application to the purpose of supplying oil to the crank-case of an automobile engine in which the "splash" system of lubricating is employed for oiling the cylinders, pistons and connecting-rod bearings.

The invention is illustrated in its preferred embodiment in the accompanying drawing, in which—

Fig. 1 represents brokenly an automobile engine, for example, equipped with the improved oiling device; Fig. 2, a plan view of the float-chamber employed; Fig. 3, a broken vertical sectional view taken as indicated at line 3 of Fig. 2, the valve-housing and float being shown in elevation, however; Fig. 4, an enlarged broken vertical sectional view of the valve-housing and attendant parts; and Fig. 5, a bottom view of the lower cap of the float-chamber.

In the construction illustrated, A represents the crank-case of an engine, in which is journaled the crank-shaft $A^1$, and upon which are mounted the cylinders $A^2$; B, a main oil-container, or source of fluid supply, from the lower portion of which depends a feed-pipe, or conduit, $B^1$; and C, an auxiliary oil-container, or float-chamber, which receives its supply from the conduit $B^1$, and which contains a float $C^1$ equipped with a valve which automatically regulates the feed to the float-chamber, the lower portion of the float-chamber being equipped with a conduit, or fitting, $C^2$, which communicates with the lower portion of the crank-case A and allows the oil to pass from the chamber C into the crank-case to maintain an oil level in the crank-case corresponding with the oil level in the float-chamber.

As the crank-shaft $A^1$ revolves, the cranks thereof pass through the oil and splash the oil into the lower portions of the cylinders $A^2$ in a manner well understood in the art. It is desirable, however, to have the oil at a comparatively low level in the crank-case and to maintain such level in order that it may be certain that the connecting rods, bearings and cylinders are properly lubricated. It is standard practice to charge the crank-case directly with oil from time to time. This practice results, ordinarily, in having the oil at too high a level in the crank-case immediately after the supply is introduced; and, in case of forgetfulness, the supply in the crank-case may become exhausted, resulting in injury to the bearings and labored working of the engine. Where the oil level is too high, the result is to cause the engine to smoke, and to cause an accumulation of carbon in the cylinders, especially where the pistons of the engine have become worn.

Notwithstanding the recognized desirability of maintaining the oil in the crank-case at a predetermined level, no solution of the problem has heretofore been made of a character to commend itself to automobile engineers, so that, as indicated above, the standard practice is to pour oil into the crank-case from time to time. Thus, in spite of the great development in the automobile industry, the method of lubricating the pistons and connecting rods continues to be open to the objections indicated above.

The device herein described enables the oil supply to be automatically maintained at just the desired level to give the best results; and when the device is used in connection with an automobile engine, the main container B can be located under the hood in an easily accessible position, and may be of large enough size to receive a sufficient supply of oil to lubricate the engine properly and in an economical manner for a long period of operation.

The main oil-container B may comprise a can of any desired shape and size. In the illustration given, the container is provided with a nipple 1 equipped with a removable cap 2, enabling the container to be filled with oil by removing the cap 2. The container B is also provided, preferably, with an indicator 3 of known construction, and serving to indicate the amount of oil in the container.

The feed pipe, or conduit, $B^1$, preferably is disconnectably joined to the tank B and float-chamber, or auxiliary container, C. The tank B is shown equipped with a nipple 4 to which the upper end of the pipe $B^1$ is disconnectably joined. The pipe $B^1$ preferably has its intermediate portion preferably coiled about the exhaust pipe 5.

The float-chamber C preferably is disposed at one side of the lower portion of the crank-case. The fitting $C^2$, which serves as a discharge conduit for the float-chamber, preferably is rigidly secured to the bottom cap of the float-chamber before the parts of the chamber are assembled, and has a threaded tubular stem which projects laterally from the lower portion of the float-chamber and screws into a tapped opening in the lower portion of one side of the crank-case. The construction enables the float-chamber, valve parts, and float to be assembled by the manufacture of the oiling device, equipped with a fitting $C^2$; and this assembly may be turned, as a unit, to screw the fitting $C^2$ into connection with the crank-case before the lower end of the feed-pipe $B^1$ is connected with the float-chamber.

It is desirable to provide a float-chamber which is small, capable of being manufactured cheaply, and which will enable the height of the oil therein to be observed. In the illustration given, the float-chamber comprises a short glass cylinder 6; an upper cap 7; a lower cap 8; and bolts 9 securing said caps together and clamping the cylinder between them, said bolts serving also as a cage, or a guide, for the float $C^1$. Gaskets 10 are interposed between the ends of the glass cylinder and caps. The caps preferably are stamped from sheet-metal. The upper cap is provided in the stamping operation with an upwardly-struck rib $7^a$ of general triangular form, and with an upwardly-struck central embossment $7^b$, connected by radial embossed extensions $7^c$ with the intermediate portions of the sides of the triangular rib $7^a$, as shown in Fig. 2. Within the outer portions of the loops formed by the rib $7^a$, the cap 7 is provided with perforations for the bolts 9. The ribbing is such as to give strength to the cap. The lower cap 8 is provided with a downwardly-struck rib, or embossment, $8^a$, of general triangular form, as shown in Fig. 5. Near one edge of the cap this rib broadens to form the wide embossment $8^b$. The embossment $8^b$ is interrupted by an unembossed portion, affording a radial recess $8^c$ in the embossment, which extends inwardly from one edge of the disk and is shaped to receive the base-portion of the fitting $C^2$. In other words, a seat in the end of a socket is afforded for the base-portion of the fitting $C^2$. In this seat-portion is provided a perforation $8^d$, which is adapted to receive a tubular threaded nipple, which serves to secure the fitting $C^2$ to the bottom cap of the float-chamber.

The lower end of the pipe, or conduit, $B^1$, preferably is connected with the upper cap of the float-chamber in the manner illustrated in detail in Fig. 4. The central embossment $7^b$ of the upper cap 7 is provided with a central perforation through which extends an exteriorly threaded tubular nipple 11, which has an enlarged lower end, preferably of hexagonal form, as indicated at $11^a$. Said nipple is adapted to serve as a valve-housing and seat. The enlarged lower end $11^a$, which is preferably of hexagonal form, is adapted to fit in a hexagonal socket 12 which is provided therefor at the inner side of the embossment $7^b$. The nipple 11 has its outer end-portion provided with a bore 13, and has its intermediate portion provided with a reduced bore $13^a$, and has its lower end-portion provided with an enlarged cylindrical bore $13^b$. The bore $13^b$ affords a cylindrical passage in which is adapted to work a spherical headed piston-valve 14, which is fixedly secured to the central portion of the upper wall of the float $C^1$. The valve 14 preferably is in the form of a portion of a sphere, and has a working fit in the bore $13^b$. When the float is in the uppermost position, the spherical surface of the piston-valve engages an annular corner 15 at the junction of the bores $13^a$ and $13^b$. The float $C^1$ may comprise a hollow brass cylinder provided with rounded ends. The purpose of the particular form of valve employed is to prevent an excess of oil from passing into the float-chamber when slight vertical oscillations of the float occur, due to the jars incident to the use of such a device on an automobile. Ordinarily, the valve 14 seats against the valve-seat 15 when the oil in the float-chamber is at the proper level. A jarring action may cause the float to descend somewhat, and this may occur without any perceptible increase of oil in the float-chamber, due to the fact that the piston-valve will maintain a sufficiently close contact with the circumferential wall of the bore $13^b$ as to prevent passage of oil, at least to any objectionable extent. The embossment $7^b$ of the upper cap of the float-chamber is clamped between the enlarged head $11^a$ of the nipple 11 and a lock-nut 16 on the nipple. The lower end of the pipe $B^1$ is connected, by a gland 17, with the upper end of the nipple 11, a gasket 18 being interposed, if desired. This connection should, of course, be oil-tight. It is unnecessary that the connection between the nipple 11 and the upper cap 7 should be oil-tight. As shown in Fig. 2, the cap 7 is provided with air-vents 19.

The fitting C² preferably comprises a hollow T-shaped casting having a hollow stem 20 with a threaded extremity adapted to screw into a tapped hole in the lower portion of the lower wall of the crank-case, and a head 21 which is internally threaded at its upper and lower ends to receive a threaded nipple 22 and a drain-cock 23. The nipple 22 extends through a perforation in the bottom cap 8 of the float-chamber, and has a flanged upper end, preferably of hexagonal form. By securing the nipple 22 into the head 21, the fitting C² is clamped to the bottom cap 8. The head 21 has its upper portion adapted to fit in the recess 8ᶜ of the embossment 8ᵇ, which is shown in Fig. 5. Thus the fitting is securely clamped to the bottom of the float-chamber in such manner that the float-chamber may be used as a handle to return the fitting into the tapped hole of the crank-case. In many engines, the crank-case is provided with a drain-cock like the drain-cock 23; and this drain-cock may be removed from the crank-case, and the threaded extremity of the fitting C² may be screwed into the tapped opening, and the drain-cock 23 may be connected with the head-portion of the fitting C² in the manner illustrated in Fig. 3.

As has been indicated, the float-chamber C and its attendant parts may be assembled in the factory; and the assembled device may, as a unit, be turned in screwing the extremity of the stem 20 into the tapped opening in the crank-case. The pipe B¹ may then be connected with the valve-nipple of the float-chamber by means of the union 17.

The operation of the device will be readily understood. The main oil-container, or reservoir, B, is filled with oil, and the oil flows through the pipe B' into the float-chamber C, causing the float C¹ to rise until the valve 14 closes the passage through the valve housing which is in communication with the lower end of the conduit B¹. Thus, the oil will partially fill the float-chamber and the lower portion of the crank-case to a corresponding level. This level is indicated in Fig. 1 by the dotted line 24. Where the oil flows freely and without hindrance into the crank-case from the float-chamber, the level in the crank-case will be the same as the level in the float-chamber. This is the preferred arrangement. It would be possible, however, to vary the level by interposing a check-valve in the fitting C², but the level in the crank-case would, in any event, be dependent upon the level in the float chamber, and vice versa. As the oil in the crank-case is depleted by the lubricating operation, the level of the oil in the crank-case and the float chamber, drops, allowing the float C¹ to descend, and thus opening the valve 14, permitting a fresh supply to feed through the pipe B¹. This action is automatic, and serves practically to maintain the oil in the crank-case at a predetermined level at all times. When necessary, the reservoir B can be re-filled with the utmost facility, as it is feasible to locate the reservoir under the hood, attached to the lower portion of the dash, if desired.

As has been noted, the passage of an automobile over rough roads tends to cause a vertical oscillation of the float, even when the float-chamber is filled to the desired level. The flooding of the float-chamber and crank-case, due to such oscillations, is prevented by the valve 14 working as a piston within the cylindrical bore 13ᵇ of the valve-housing; and oil is admitted to the float-chamber in quantity only when the float drops sufficiently to withdraw the large diameter of the ball 13 from the bore 13ᵇ. When the float is in its uppermost position, the ball makes contact with the inner circumferential wall of the cylindrical extension 11ᵃ of the valve-seat in one plane, and makes contact with the annular shoulder 15 in another plane, so that the passage through the valve-seat is sealed in a most efficient manner. When the float drops slightly, should there be any slight seepage past the lateral walls of the ball 14, it would be insufficient to flood the float-chamber, as the use of the lubricant would more than compensate. It may be noted, also, that the float C¹ is loosely confined between the bolts 9, which serve as guides. This permits such freedom of movement of the float as to effectually prevent binding. The ball-valve, which is rigidly carried by the upper wall of the float, acts as a universal joint, permitting the slight lateral oscillations of the float incident to the use of the loose guide-connection between the float and the guide-bolts, or cage, 9.

The improved device may be used in other situations which are analogous for the purpose of automatically maintaining a given level of fluid, or lubricant, in a casing in which is mounted a moving part requiring lubrication. If desired, the reservoir B may be of quite large dimensions, and a plurality of oil-containers may be connected therewith by suitable conduits, the auxiliary oil-containers being connected with one or several casings in which moving parts requiring lubrication are mounted.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. In means of the character set forth, the combination of a source of fluid supply, a float-chamber, a conduit from said source of supply, a valve-housing with which said conduit communicates, said valve-housing having a cylindrical passage opening toward the float-chamber, a float fitting loosely in said float-chamber, a spherical headed piston-valve operated by said float and working in closing contact in said cylindrical passage, a chamber wherein a working level of fluid is to be maintained, and a discharge-conduit for conducting fluid from the float-chamber to said last-named chamber.

2. In means of the character set forth, a float-chamber having its upper end equipped with an annular valve-seat and with a depending cylindrical wall thereat, a supply conduit leading to said valve-seat, a float in said chamber carrying a spherical headed valve adapted to work as a piston making closing contact within said cylindrical wall and to engage said seat when the float is elevated, and a discharge conduit leading from said float-chamber.

3. In means of the character set forth, a supply conduit, a float chamber, and a float in said chamber, and a valve actuated by said float, a tubular nipple communicating with said conduit and having a seat adapted to be engaged by the valve when the float is in its highest position, and having a vertical wall adapted to form closing contact with the valve when the float oscillates, said valve being of such form as to shut off feed from the supply conduit by its engagement with the vertical wall during a limited range of oscillation and also with the seat to maintain a closure at two planes when the float is at the highest point.

4. In means of the character set forth, a float-chamber comprising a cylinder and upper and lower caps therefor, a nipple extending through a perforation in the top cap thereof and having an enlarged lower end with a valve-seat therein, a lock-nut on said nipple above said top cap, a float in said chamber having a spherical headed valve secured to its upper wall adapted to fit slidably in the enlarged lower end and to engage said seat, and a discharge conduit leading from said float-chamber.

5. In means of the character set forth, a float-chamber comprising a cylinder, an upper sheet-metal cap having a central perforate embossment and strengthening ribs radiating therefrom, a lower cap, and bolts clamping said caps on said cylinder, a threaded nipple flanged at its lower end and extending through said central embossment and having a lock-nut above said embossment, said nipple having a valve-seat in its lower end, a supply pipe connected with said nipple, a float in said chamber carrying a valve engaging said valve-seat, and a discharge conduit connected with the lower cap of the float-chamber.

6. In means of the character set forth, a float-chamber comprising a cylinder, an upper cap thereon, a lower cap provided with a recessed external embossment on its lower side affording a socket near one edge thereof with a perforation through the cap at said socket, and bolts clamping said caps on said cylinder, a supply conduit communicating with said float-chamber through said upper cap, a valve-seat at the lower end of said supply conduit, a float in said chamber equipped with a valve adapted to engage said valve-seat, a tubular fitting having a head engaging the socket of said lower cap and having a laterally-extending hollow stem with a threaded extremity, and a tubular nipple flanged at its upper end and extending through the perforation of said bottom cap and having screw-connection with the head-portion of said tubular fitting.

7. In means of the character set forth, a float-chamber comprising a cylinder, end caps thereon, bolts connecting said caps and forming a valve-cage, a supply conduit communicating with the float-chamber through the central portion of the upper cap thereof, a valve-seat at the lower end of said supply conduit, a float confined between said bolts within the cylinder and having its upper end equipped with a valve adapted to engage said valve-seat, and a discharge conduit connected with the lower end-cap of the float-chamber.

8. In means of the character set forth, a float-chamber, an annular valve-seat connected with the central portion of the top-wall of said float-chamber, a supply conduit communicating with said valve-seat, a float in said chamber equipped with a ball-valve adapted to engage said valve-seat, a cage for said float loosely confining the same and permitting vertical movement and limited swinging movement of the float without moving the valve from its seat, and a discharge conduit communicating with the float-chamber.

9. In means of the character set forth, a float-chamber equipped at its upper wall with an annular valve-seat and a cylindrical wall of larger diameter depending from said valve-seat, a supply conduit communicating with said valve-seat, a float in said chamber having at its upper side a ball-valve adapted to work with closing contact within said cylindrical wall and to make contact with said valve-seat when the float is in its uppermost position, guide-means loosely confining said float and permitting limited swinging motion thereof, and a discharge conduit communicating with said float-chamber.

10. In means of the character set forth, the combination of a crank-case, a float-chamber equipped with a rigid discharge conduit having a laterally-extending hollow stem provided with a threaded extremity, received by a tapped opening in the crankcase, a supply conduit, a sheet metal cap for the float chamber, a member having an internal valve-seat connected with the upper portion of the float-chamber through the cap, a union detachably connecting said supply conduit with the float-chamber through said member, and a float in said float-chamber equipped with a valve adapted to engage said valve-seat.

11. In means of the character set forth, a float-chamber comprising a glass cylinder, stamped sheet-metal upper and lower caps therefor, bolts connecting said caps, a nipple extending through the upper cap and clampingly connected therewith and having an inner valve seat, a supply conduit disconnectably joined to said nipple, a float in said chamber equipped with a valve adapted to engage said valve-seat, a tubular fitting having a head-portion disposed beneath the lower end-cap near one edge thereof and having a laterally-extending hollow stem provided with a threaded extremity, and a tubular nipple having a flanged upper end and a threaded sleeve extending through the wall of the lower end-cap and screwed into the head-portion of said tubular fitting, whereby said fitting is clampingly secured to the lower end-cap of the float-chamber.

12. In a lubricating device, a float chamber comprising a cylinder, an upper sheet metal cap, a lower cap, bolts spaced apart near the periphery for clamping said caps on the cylinder, a supply pipe with means forming a valve seat in the upper cap, a float fitting loosely between the bolts in said chamber carrying a valve engageable with said valve seat, and a discharge conduit connected through the lower cap of the float chamber.

WENDELIN P. SENG.